_United States Patent_ [19]

Repella

[11] 3,987,663
[45] Oct. 26, 1976

[54] METHOD AND APPARATUS FOR QUICKLY TESTING THE SEALING EFFECTIVENESS OF A RADIAL-LIP SHAFT SEAL

[75] Inventor: James A. Repella, Madison Heights, Mich.

[73] Assignee: Federal-Mogul Corporation, Detroit, Mich.

[22] Filed: Oct. 29, 1974

[21] Appl. No.: 518,607

[52] U.S. Cl. .................................. 73/46; 277/2
[51] Int. Cl.² ............... G01M 3/28; F16J 15/32
[58] Field of Search ........... 73/40, 46, 49.8; 277/2

[56] References Cited
UNITED STATES PATENTS

| | | | |
|---|---|---|---|
| 2,924,965 | 2/1960 | Westerheim | 73/40 |
| 3,132,507 | 5/1964 | Dega | 73/45.2 |
| 3,161,040 | 12/1964 | Ver Halen | 73/46 |
| 3,180,135 | 4/1965 | Cain, Jr. et al. | 73/46 |
| 3,188,855 | 6/1965 | Dega | 73/46 X |

Primary Examiner—Jerry W. Myracle
Assistant Examiner—John S. Appleman
Attorney, Agent, or Firm—Owen, Wickersham & Erickson

[57] ABSTRACT

A method and device for quickly testing the sealing effectiveness of a shaft seal of the type having a radial shaft-engaging lip. A rotatable test shaft has an outer periphery preferably slightly smaller than the shaft for which the seal lip is designed, and the lip of the seal to be tested engages that periphery. The shaft centerline has a predetermined degree of offset from its own axis of rotation, so that the seal lip is subjected to a predetermined shaft runout when the test shaft is rotated at a desired speed. A stationary means supports the seal in a normally leak-tight manner and cooperates with the test shaft and seal to provide a chamber. Air is sent under a desired pressure to the chamber, and it is determined whether there is leakage of air from said chamber.

10 Claims, 4 Drawing Figures

PRESSURE LOSS IN EACH OF A SERIES OF SEALS DURING 3 SECOND TEST — SHAFT ROTATED AT 100 RPM AT 0.010 TIR RUNOUT — AIR PRESSURE 8.5 PSI

PRESSURE LOSS IN EACH OF A SERIES OF SEALS DURING 3 SECOND TEST – ZERO SHAFT ROTATION – ZERO OFFSET – AIR PRESSURE 8.5 PSI

PRESSURE LOSS IN EACH OF A SERIES OF SEALS DURING 3 SECOND TEST — SHAFT ROTATED AT 100 RPM AT ZERO RUNOUT — AIR PRESSURE 8.5 PSI

METHOD AND APPARATUS FOR QUICKLY TESTING THE SEALING EFFECTIVENESS OF A RADIAL-LIP SHAFT SEAL

BACKGROUND OF THE INVENTION

This invention relates to method and apparatus for testing the sealing effectiveness of a radial-lip type of oil seal.

Since radial-lip oil seals are precision products made in large quantities it is on the one hand very desirable and on the other hand very difficult to determine whether they are effective before they are installed, usually in some part of an automobile or machine which is completely inaccessible without considerable removal of parts. Oil seals can, of course, be tested by placing them on a shaft similar to that on which they are to be used and actually running them under conditions to which they are to be subjected and noting whether there is leakage of oil. However, this very slow test is quite impractical except on a small sampling of seals. It is very useful in determining the practicality of a particular design, but is not applicable for testing a large number of seals as actually produced.

As a result, there have been proposals for testing seals in a more rapid manner. The apparatus disclosed in the Dega U.S. Pat. No. 3,097,521 tests for leakage by using air under such pressure that there is bound to be leakage, the amount of leakage then being determined. The test results do not completely correspond with the results of actual use of the seals and do not, in fact, determine with sufficient accuracy which seals are likely to leak under actual conditions of use. This failing is due to the fact that the test bears small relation to the actual conditions of use, where such pressures as are used in testing are not encountered.

Static air test methods have likewise been proposed where the air pressure is such that there is no leakage except in defective seals. However, it has been determined that in many instances seals which will hold air pressure under static conditions will not prevent oil leakage during actual use.

Thus, it is an object of the present invention to provide both method and apparatus for testing a seal in a rapid manner so that a large number of seals, possibly even the entire production run, can be tested in lieu of mere visual inspection, and also, to enable the test results to correspond more nearly with the actual performance to be expected from such seals.

SUMMARY OF THE INVENTION

The present invention rests on the discovery that oil seals can be quickly tested with considerable accuracy by an air leakage test apparatus, provided that they are tested while the test shaft is rotating and is doing so while its centerline is offset somewhat from its own axis of rotation, so that there is a predetermined amount of shaft runout. When seals are tested on a static shaft or even on a rotating shaft without runout, the results are far less likely than when tested according to the present invention to correspond to actual performance of the seal under its normal operating conditions. If desired, the center of rotation of the shaft can be offset slightly from the center of the test fixture bore to cause another operating condition referred to as "bore to shaft misalignment," or sometimes synonymously as "eccentricity." The present invention provides an apparatus that can in a few seconds determine the likelihood of successful operation of a seal. Therefore, it becomes possible to test large numbers of such seals.

The device uses a rotatable test shaft with an outer periphery substantially like that of the shaft for which the seal is actually designed but preferably slightly smaller in diameter so as to increase its sensitivity. The shaft, however, is mounted on a drive motor in such manner as to have a predetermined amount of shaft runout, which may be varied somewhat depending upon the type of seal employed, which is very valuable in determining the operativeness of the seal. Rotating the shaft at a predetermined speed and at a predetermined runout affords standard conditions which can be made to correspond substantially with seal operability predictions. While the shaft is being rotated with this predetermined runout and at the predetermined speed, air is sent to a chamber which is closed partly by the seal lip itself. Leakage is then detected, and if there is a substantial amount of leakage, the seal can be safely predicted to be inoperative whereas if there is no such leakage, the seal is quite safe to install.

The leakage is preferably determined by a comparison-type apparatus in which the seal is compared by a differential pressure type of sensor, which measures the air pressure in the chamber bounded by the seal in comparison with that of a fully closed and sealed chamber to which the air is simultaneously admitted. After each test, both chambers are bled to atmosphere, and at the beginning of each test the chambers are again pressurized, after the seal has been installed. The differential pressure type sensor, which is preferably a transducer, and associated electronic unit may be standard off-the-shelf items.

Other objects and advantages of the invention will appear from the following description of a preferred form of the invention shown in the accompanying drawings.

DESCRIPTION OF A PREFERRED EMBODIMENT

Figure 1:
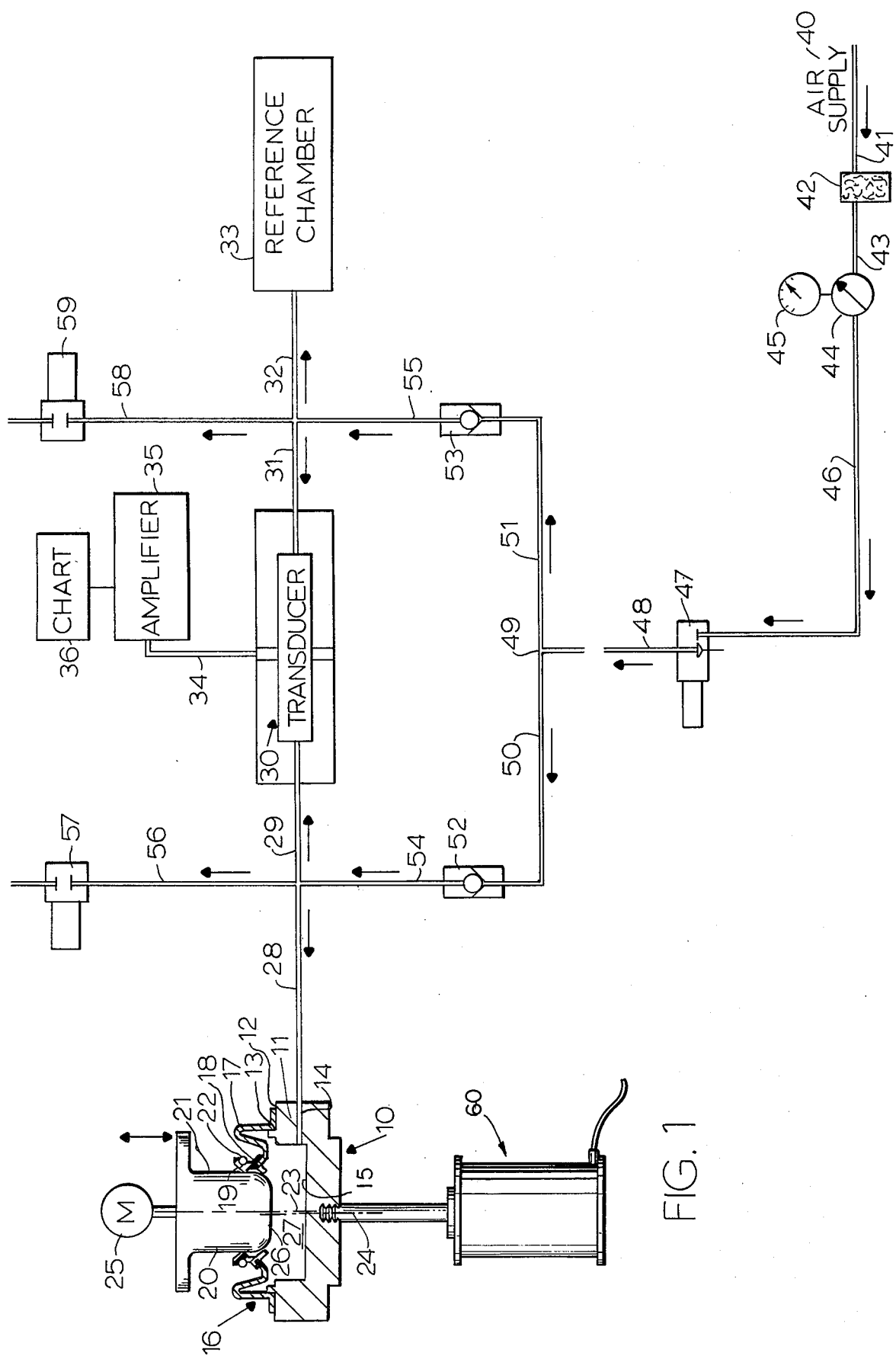
FIG. 1 is a diagrammatic view of an apparatus embodying the principles of the invention.

As shown in FIG. 1, the device includes a stationary fixture 10 having an annular portion 11 provided with a surface 12, a suitable shoulder 13, or other configuration on which the seal to be tested can be readily mounted and readily removed. The shape and size of the fixture 12 may differ according to the type and size of seal being tested and the configuration shown in the drawing is just an example, since it will be apparent to one skilled in this art how to modify the test fixture 10 for a different seal design. The fixture 10 has a passageway 14 leading into a recess 15.

By way of example, a seal 16 to be tested is shown mounted on the fixture 10. This seal 16 is provided with a metal case 17 supporting an elastomeric element 18, which may be bonded to the case 17. The elastomeric element has at least one lip 19 to be tested. The seal 16 to be tested is typically one of a production run in which all or considerable number of the seals are to be tested.

The test apparatus also includes a test shaft 20 having a peripheral surface 21 for which the seal lip 19 is designed. The seal 16 may be designed to include a garter spring 22 to hold the lip 19 in engagement with the periphery 21. If the seal is designed to have no garter spring, it is, of course, tested without one.

The shaft 20 is mounted to provide a desired amount of shaft runout. In other words, its axis of rotation 23 is offset with respect to its centerline 24. By having a shaft 20 that is not rotating about its true center, operation under more severe conditions is attained. The runout is chosen so as not to be excessive, that is, not beyond that which is to be tolerated in the machine part, or at least only slightly beyond that, if at all. The idea is not to reject practically all seals, but to test the seal to a degree such that if it fails in this test, it would be almost certain to fail during operation; and if it succeeds in the test, it would be almost certain to succeed in the operation. While 100 percent might not be attainable in this connection due to faults in installation or faults that develop only on prolonged running, still the test has been shown to be very accurate. The shaft 20 is rotated by a suitable motor 25 to rotate at a desired speed corresponding to that expected in actual operation.

An end wall 26 of the test shaft 20 cooperates with the recess 15 of the stationary seal fixture 10 to provide a chamber 27 when the seal 16 is installed, the chamber 27 being bounded by the fixture 10, the shaft 20 and the seal 16 to be tested. Recess 15 aids in giving sufficient volume to provide convenient and uniform operation.

The passageway 14 leading into the chamber 27 is connected to a suitable conduit 28 which leads via a conduit 29 to one side of a transducer 30. Another side of the transducer 30 is provided with a conduit 31 leading via a conduit 32 to a reference chamber 33 of suitable size. The transducer 30 has its electrical output connected by leads 34 to a suitable electronic amplifier unit 35 which may be connected to a chart unit 36 or to a visual display for showing the results and enabling the tester to know whether the seal 16 has passed the test or not.

A suitable source 40 of air under pressure provides the air, and the air is sent through a conduit 41 to a filter 42 where any solid particles or liquid particles, or other troublesome material, is removed. From the filter 42, the air passes by a conduit 43 to a regulator 44 which regulates the pressure within carefully defined ranges. A gauge 45 may be mounted on the regulator 44 to determine the pressure that is being sent to the operative parts of the device. A conduit 46 then leads from the regulator 44 to a solenoid valve 47. This valve 47 is normally closed and is opened to permit a charge of air to pass from the regulator 44 to the conduits beyond the solenoid valve 47. A conduit 48 leads from the solenoid valve 47 and is branched at a tee 49 into two identical conduits 50 and 51, which go to identical check valves 52 and 53. From the check valve 52 a conduit 54 goes to the conduit 28 leading to the test fixture 10, while from the check valve 53 a conduit 55 goes to the conduit 32 leading to the reference chamber 33. A conduit 56 leads from the conduits 54 and 28 to a normally closed solenoid valve 57, while a conduit 58 leads from the conduits 55 and 32 to a normally closed solenoid valve 59. These two solenoid valves 57 and 59 are preferably operated simultaneously so that they are either both open or both closed.

In the test, then, the seal 16 to be tested is mounted in place and the test shaft 20 moved within it by actuation of the relative retraction means 60. It may be moved in it while rotating or while stationary. Once the shaft 20 is in sealing engagement with the lip 19, a predetermined charge of air at the regulated pressure is imparted by the solenoid valve 47 to both the test chamber 27 and the reference chamber 33. The charge is then cut off by closing the solenoid valve 47, and the check valves 52 and 53 prevent back flow. The two solenoid valves 57 and 59 are closed at this time. The test operation continues with the test shaft 20 rotating. The test takes only a few seconds.

If the seal 16 is a defective and leaks, this is reflected at the transducer 30 by comparison of the pressure in the conduit 29 with the pressure in the reference conduit 31. It is generally better to provide the reference chamber 33 rather than to have the transducer 30 itself provide an absolute standard, but this is not absolutely essential, and the operation is, of course, possible without a reference chamber system. If there is any leakage whatever from the seal 16 being tested, then the transducer 30 determines whether that leakage is also present in the reference chamber 33, which may mean that the conduit system or check valve system, or something of that nature is defective. Supposing that the reference chamber 33 is stable, the transducer's sensing is passed on to the amplifier unit 35 and is indicated on the chart 36 or on a display panel, where it is easily determined whether the test seal 16 is leaking.

At the conclusion of the test, which as has been said lasts only a few seconds, the solenoid valves 57 are opened to discharge the pressure over atmospheric from both the test chamber 27 and the reference chamber 33, the test shaft 20 is withdrawn, and the seal 16 is removed and either passed or rejected, depending on the test results. Then the next seal is installed and tested in the same manner.

Figure 2:
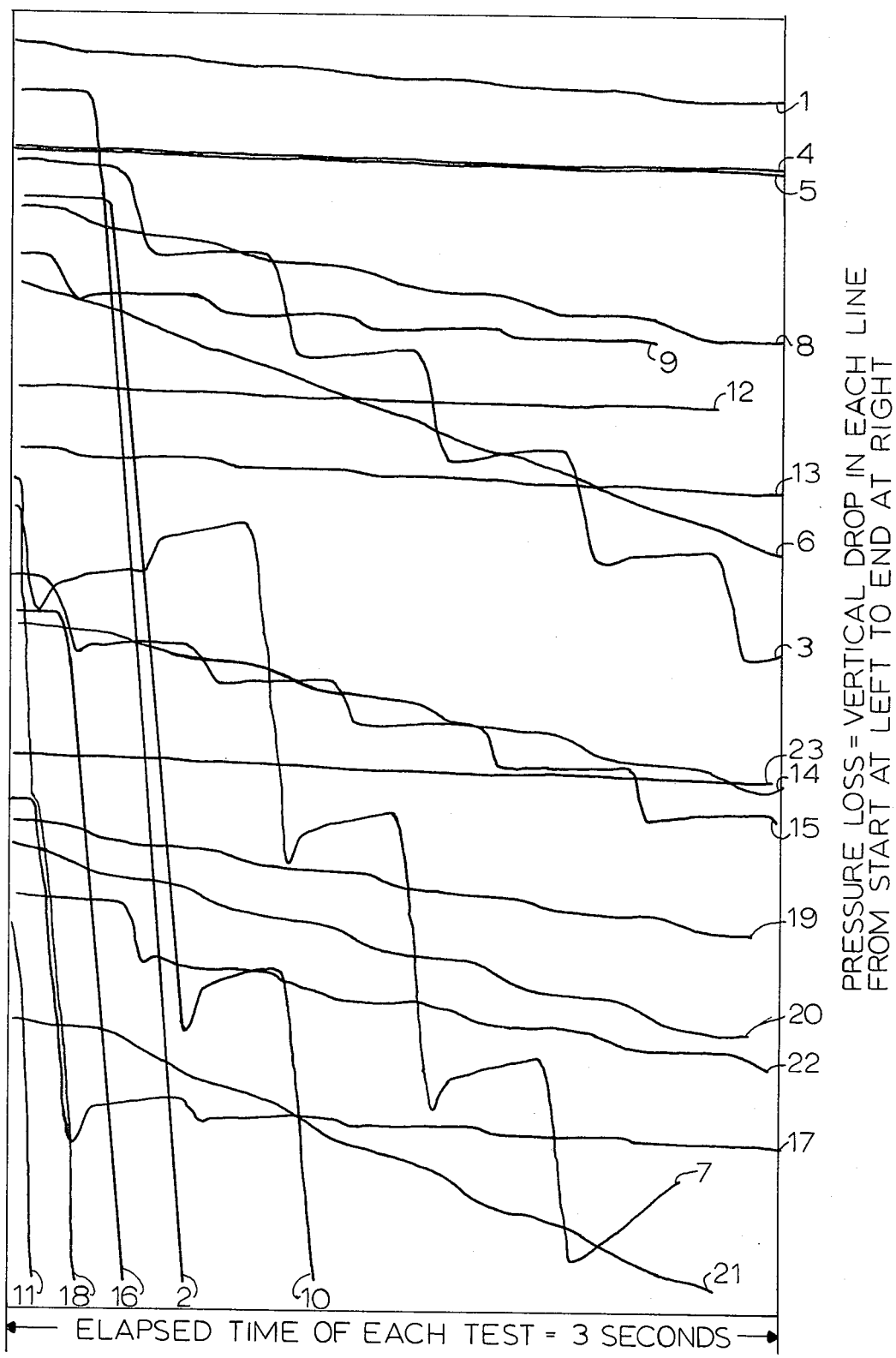
FIG. 2 is a chart obtained from actual tests using a device like that of FIG. 1, with the test fixture rotating and having runout, and having no bore to shaft misalignment.
Figure 3:
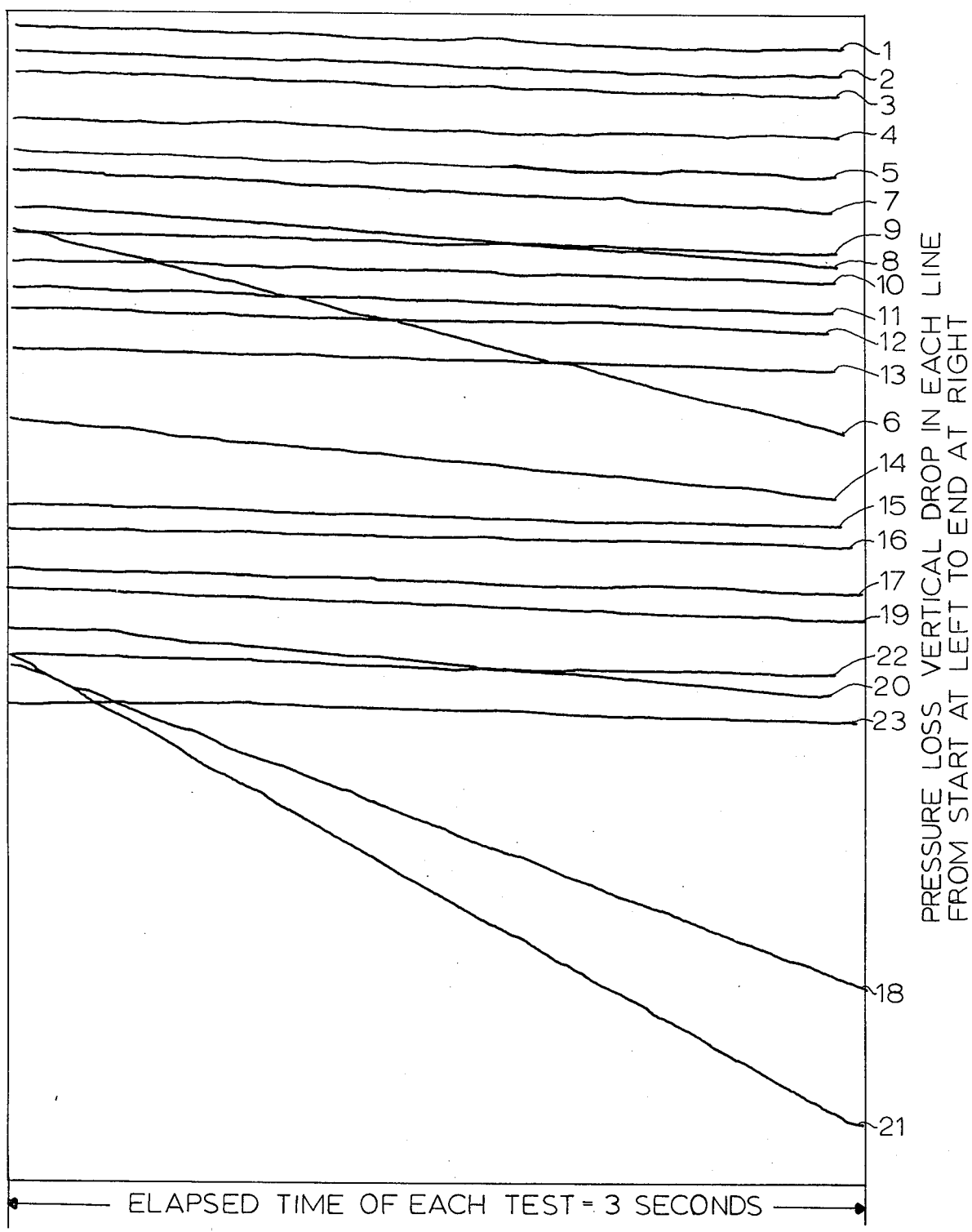
FIG. 3 is a similar chart made without rotating the shaft.
Figure 4:
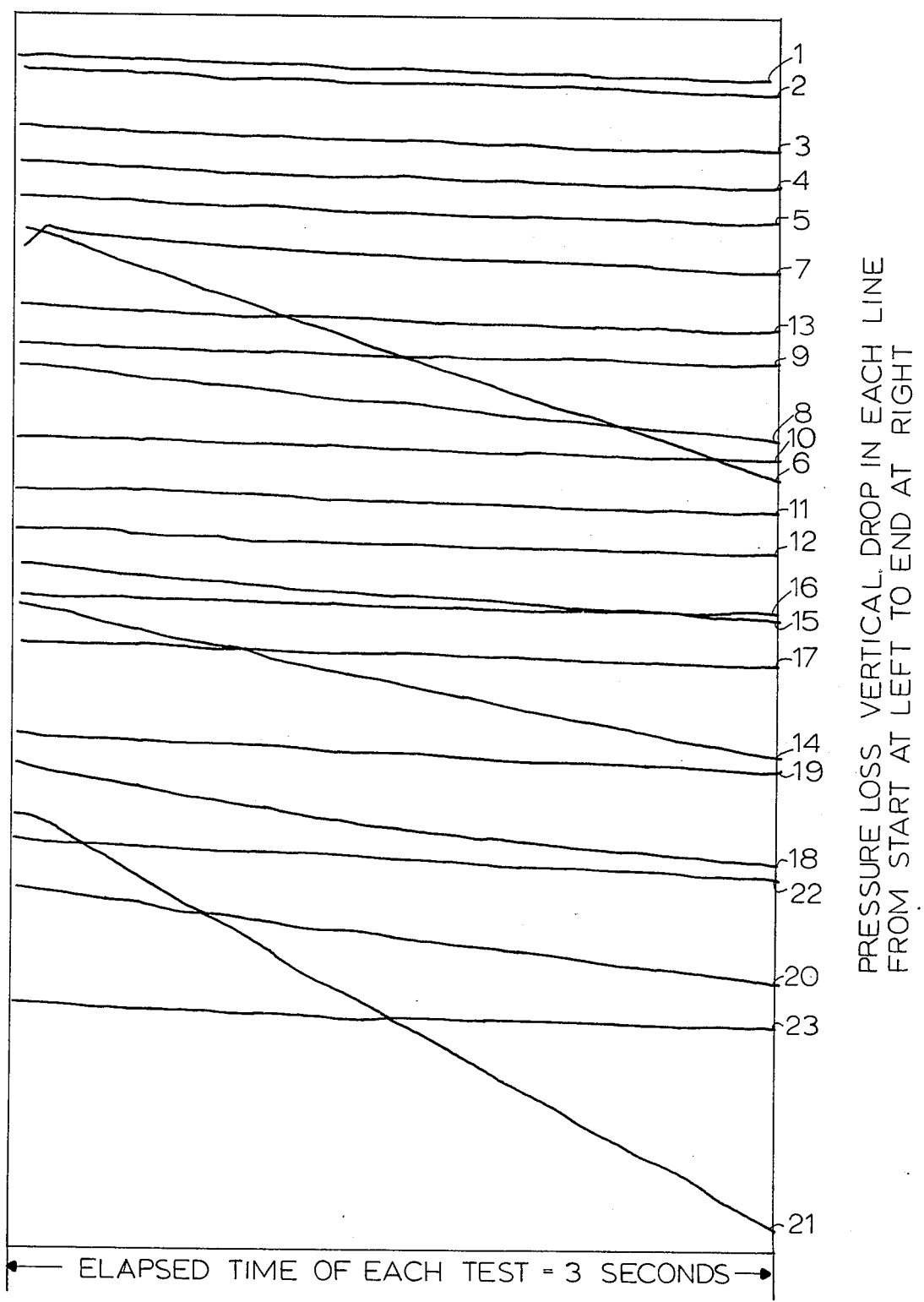
FIG. 4 is a similar chart made with the shaft rotating but having no runout, and having no bore to shaft misalignment.

FIGS. 2, 3, and 4 illustrate the fact that the invention achieves marked improvement over a testing device substantially identical except that the shaft does not rotate, and also over one which rotates but without runout. FIGS. 2, 3, and 4 are time charts made with the same seals. A sampling of seals was chosen, all of which had some visual defect which might or might not affect operation; the solution was not a random cross-sampling of production seals, but a special choice so that there would be a large number of inoperative seals in the sample. The seals are numbered with the same numbers in each drawing although they do not appear in the same order on all charts, because a few of them were taken out of order in one test or another. The recording chart used expresses time from left to right, about three seconds across the chart. The other measurement to be taken into account is the drop in pressure which is measured on the vertical axis. The starting point of any particular line has no significance whatever. If there is no drop whatever in pressure during the three-second test, then the lines will be completely horizontal. A slight downtrend of the line showing a very small leak is of small significance. Oil is much more viscous than air and is far less likely to leak. A sharp downtrend corresponds to seal failure.

These three charts are reproductions of actual charts made in actual tests, and the seals were the same seals. This is not a theoretical example—these tests show that the device of the present invention is effective in detecting seal defects where other tests would have failed to discover these defects.

In FIG. 3, where there is no shaft rotation (and also no eccentricity) upon applying 8.5 psi air to the test chamber 27 of the device of FIG. 1, there were only three seals showing marked inoperativeness: numbers 6, 18, and 21. Some other seals shows less marked degradation, such as seals number 6, 8, 14, and 20. The remaining seals do not look particularly bad and might, according to this test, be passed.

FIG. 4 shows the difference made by actually rotating the shaft 20, the air pressure still being at 8.5 psi, but in this case there was no shaft runout. Again, seals 6 and 21 look bad. Somewhat surprisingly, seal number 18 does not look as bad as it did when stationary; this may mean that the installation on the stationary shaft 20 was at one of its weak points. It might have behaved almost normally had it been rotated slightly. Other seals, such as seal 14, shows up as being bad, and, again, seals 8, 15, 18, and 20 appear definitely to be faulty. Most of the other seals appear to be satisfactory.

However, when one turns to FIG. 2, in which the shaft 20 was run at the same speed (100 r.p.m.) as for FIG. 4, at the same pressure as both FIGS. 3 and 4, but with a runout of 0.010 TIR, the defectiveness of the seals shows up strikingly. Very few of this batch of seals were able to pass this particular test. Seal 1 shows a fairly strong decline, seals 4 and 5 seem to be relatively satisfactory, as do seals 12, 13, and 23; but all of the other seals showed up their defectiveness. Seals number 2, 10, 11, and 16–18, show an almost instantaneous loss of pressure, although seal 17 seems to have recovered somewhat later on. Note that in some of the seals, such as seal 3 and seal 15, there is a decline once every cycle, showing that at one point on each rotation of the shaft 20, leakage occurred. This also happened with seal 7, where it is very marked and apparently also somewhat with seal number 10 which quickly let its air out. In other instances, a relatively straight decline occurred, as in seal 6 (which all three tests showed up as defective) and seal 21.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for quickly testing the sealing effectiveness of an unlubricated shaft seal of the type having a radial shaft-engaging lip and a boreengaging periphery, including in combination:

first means for supporting the periphery of said seal to be tested in a normally leak-tight manner, a rotatable test shaft having an end facing said first means and having an outer unlubricated periphery of the size for which the seal to be tested is designed, said shaft being mounted so that its axis of rotation is offset from the centerline of said shaft and the lip of the seal supported by said first means is eccentric relative to the axis of rotation of said shaft when said seal lip engages said periphery, said shaft having a predetermined runout relative to said first means so that said seal lip is subjected to a predetermined shaft runout during rotation of said shaft, means for imparting relative axial retraction of said first means from said shaft for enabling installation and removal of said seal to be tested over said end and for imparting relative axial movement of said first member toward said shaft for engagement with said seal during testing, means for causing relative rotation between said first means and said test shaft at a desired speed, said first means, said test shaft, and the seal to be tested cooperating to provide and to bound and totally constitute a dry test chamber completely enclosed except for an air inlet, so that it can be kept free of liquids, means for sending gas under a desired pressure to said test chamber via said air inlet, and means for detecting whether there is leakage of gas from said test chamber.

2. The device of claim 1 wherein said means for detecting comprises transducer means, a comparison chamber, and means for charging said test chamber and said comparison chamber with identical gas pressures, said transducer means being connected to both said test chamber and said comparison chamber and including means for indicating differential pressures between said chambers.

3. A device for quickly testing the sealing effectiveness of an unlubricated shaft seal of the type having a radial shaft-engaging lip and a mounting portion, including in combination:

seal support means having a directly accessible structure open to the atmosphere for directly receiving, with a slip-in fit, a seal to be tested at its said mounting portion and for supporting said seal in a leak-tight manner, a rotatable test shaft having an end facing said seal support means and having its centerline offset from its axis of rotation and having an outer unlubricated periphery of the size for which the seal to be tested is designed, so that the lip of the seal engages said periphery, said shaft having a predetermined runout relative to said axis of rotation and to said seal support means, so that said seal lip is subjected to a predetermined shaft runout, means for moving said seal support means and test shaft relatively to each other into a retracted position for installation and removal of each said seal over said end and for moving said seal support means and said test shaft relatively to each other into an advanced position for testing said seal, means for rotating said test shaft at a desired speed, said seal support means, said test shaft, and the seal to be tested bounding and providing all the elements of a dry test chamber which is completely accessible at all times, and is completely enclosed except for an air inlet, so that it can be kept free of liquids, a comparison chamber separate from said test chamber, means for sending air under a desired pressure to both said chambers simultaneously transducer means for detecting any development of pressure differences between said chambers, and indicator means for indicating pressure differences corresponding to those caused by leakage of a defective seal being tested.

4. The device of claim 3 having a pair of valves for discharging air at over atmospheric pressure from both chambers after each test.

5. A device for quickly testing the sealing effectiveness of an unlubricated shaft seal of the type having a mounting portion and a radial lip for engaging a rotating member, including in combination:
- a rotationally stationary member having a fully exposed surface open to the atmosphere for directly receiving with a slip-in fit said mounting portion of a seal to be tested and for supporting it stationarily in a leak-tight manner,
- a rotatable member having an end facing said stationary member and having an unlubricated periphery of the size for which the seal lip to be tested is designed, so that the lip of the seal engages said unlubricated periphery and a centerline offset from its axis of rotation, said rotatable member having a predetermined runout with respect to said stationary member, so that said seal lip can be subjected to a predetermined shaft runout,
- support means for supporting said rotatable member and said stationary member for relative axial reciprocation,
- retraction means for causing relative movement between said stationary member and said rotatable member for enabling installation and removal of a said seal over said end on said stationary member and for advancing said stationary member and said rotatable member toward each other in relative movement into seal-engaging position during test,
- means for rotating said rotatable member at a desired speed,
- said stationary member, said rotatable member and said seal to be tested providing all the elements of a dry test chamber and being directly accessible without the removal of any additional elements, said test chamber being completely enclosed except for an air inlet, so that it can be kept free of liquids,
- means for sending air under a desired pressure to said air inlet of said test chamber, and
- means for detecting whether there is leakage of air from said test chamber.

6. The device of claim 5 having
- a comparison chamber, said means for sending air for charging both said test chamber and said comparison chamber with air at identical pressures,
- said means for detecting including transducer means for detecting differences between the pressure in said test chamber and the pressure in said comparison chamber.

7. The device of claim 6 having means for discharging the air from both chambers after each test.

8. A method for quickly testing the sealing effectiveness of a dry annular shaft seal of the type having a mounting portion and a radial lip, including in combination:
- slipping the mounting portion of a dry, unlubricated seal to be tested onto a support member to engage it in a normally leak-tight manner,
- engaging said lip with a rotatable member having a periphery of the size for which the lip of the seal to be tested is designed, so that the lip of the seal engages said periphery,
- said seal, when its lip is so engaged forming on one side part of an enclosed test chamber having an air inlet, the rest of said chamber consisting of said rotatable member and said support member, said test chamber being kept free from liquids, the other side of said seal being open to the atmosphere,
- rotating said rotatable member at a desired speed in the absence of lubricants and at a predetermined runout with respect to its axis of rotation, said axis of rotation being offset with respect to the mounting portion, so that said seal lip is subjected to a predetermined shaft runout and eccentricity,
- sending air under a desired pressure to said air inlet of said test chamber,
- detecting whether there is leakage of air from said test chamber,
- retracting said support member and said shaft relatively to each other so that said shaft becomes out of engagement with said seal, and withdrawing said seal from said support member.

9. The method of claim 8 in which the air sent to said test chamber is also sent simultaneously to a comparison chamber, said detecting step involving comparing the pressure in said test chamber with that in said comparison chamber.

10. A method for quickly testing the sealing effectiveness of a dry annular shaft seal of the type having an outer portion and a radial shaft-engaging lip, including in combination:
- slipping the outer portion of an annular seal to be tested onto an exposed support member in a normally leak-tight manner,
- inserting from a normally retracted position, relative to said support member a rotatable test shaft having an outer periphery of the size for which the dry, unlubricated lip of the seal to be tested is designed, so that the unlubricated lip of the seal engages said periphery, one side of said seal closing off a chamber between said shaft and the support member for the outer portion of the seal, said chamber then consisting of said seal, shaft, and support member, said chamber having an air inlet and being kept free from liquids, the other side of said seal being open to the atmosphere,
- rotating said test shaft at a desired speed in the absence of lubricants and at a predetermined runout relative to said support member, so that said seal lip is subjected to a predetermined shaft runout and eccentricity,
- sending air under a desired pressure to said air inlet of said chamber,
- detecting whether there is leakage of air from said chamber,
- relatively retracting said shaft from said seal, and removing said seal.

* * * * *